United States Patent [19]

Gokcen et al.

[11] Patent Number: 5,125,024
[45] Date of Patent: Jun. 23, 1992

[54] VOICE RESPONSE UNIT

[75] Inventors: Sedat I. Gokcen, Gahanna; Roy V. Grubbe, Columbus; Robert J. Perdue, Pickerington, all of Ohio

[73] Assignee: AT&T Bell Laboratories, Murray Hill, N.J.

[21] Appl. No.: 500,336

[22] Filed: Mar. 28, 1990

[51] Int. Cl.⁵ .................. H04B 3/23; H04M 1/64; H04M 1/74
[52] U.S. Cl. ............................ 379/88; 379/67; 379/410
[58] Field of Search .............. 379/89, 88, 67, 410, 379/411; 370/32.1

[56] References Cited

U.S. PATENT DOCUMENTS

| | | | |
|---|---|---|---|
| Re. 31,253 | 5/1983 | Weinstein | 370/32.1 |
| 4,088,838 | 5/1978 | Nakata et al. | 379/89 |
| 4,521,647 | 6/1985 | Olson et al. | 379/351 |
| 4,539,675 | 9/1985 | Fisher | 370/32 |
| 4,621,172 | 11/1986 | Kanemasa et al. | 370/32.1 |
| 4,747,126 | 5/1988 | Hood et al. | 379/74 |
| 4,769,808 | 9/1988 | Kanemasa et al. | 370/32.1 |
| 4,785,408 | 11/1988 | Britton et al. | 364/513.5 |
| 4,785,473 | 11/1988 | Pfeiffer et al. | 379/89 |
| 4,862,450 | 8/1989 | Guidoux | 370/32.1 |
| 4,868,874 | 9/1989 | Takatori et al. | 379/411 |
| 4,891,801 | 1/1990 | Marcos et al. | 370/32.1 |
| 4,899,373 | 2/1990 | Lee et al. | 379/207 |
| 4,914,692 | 4/1990 | Hartwell et al. | 379/410 |

FOREIGN PATENT DOCUMENTS 0166393  1/1986  European Pat. Off. ............. 379/88

OTHER PUBLICATIONS

*Telecommuniations Transmission Engineering*, American Telephone and Telegraph, First Edition 1977, pp. 126 through 132.

Primary Examiner—Thomas W. Brown
Attorney, Agent, or Firm—D. A. Marshall

[57] ABSTRACT

A voice response unit for transmitting voice prompt messages to customers and for receiving messages generated by customers in response to the voice prompt message. The unit has a speech recognizer for recognizing customer commands used to control operation of the voice response unit. Apparatus interconnects a voice decoder and voice recorder with a telephone line to transmit a generated voice prompt message and to recieve a customer message in response thereto from a calling customer coupled with the telephone line. The apparatus is also coupled with the speech recognizer and responds to receipt of a customer command combined with a portion of the transmitted voice prompt message reflected from the telephone line by cancelling the reflected voice prompt message with the transmitted voice prompt message thereby enabling the speech recognizer to respond to the customer command during transmission of the voice prompt message and interrupt the voice prompt message.

9 Claims, 3 Drawing Sheets

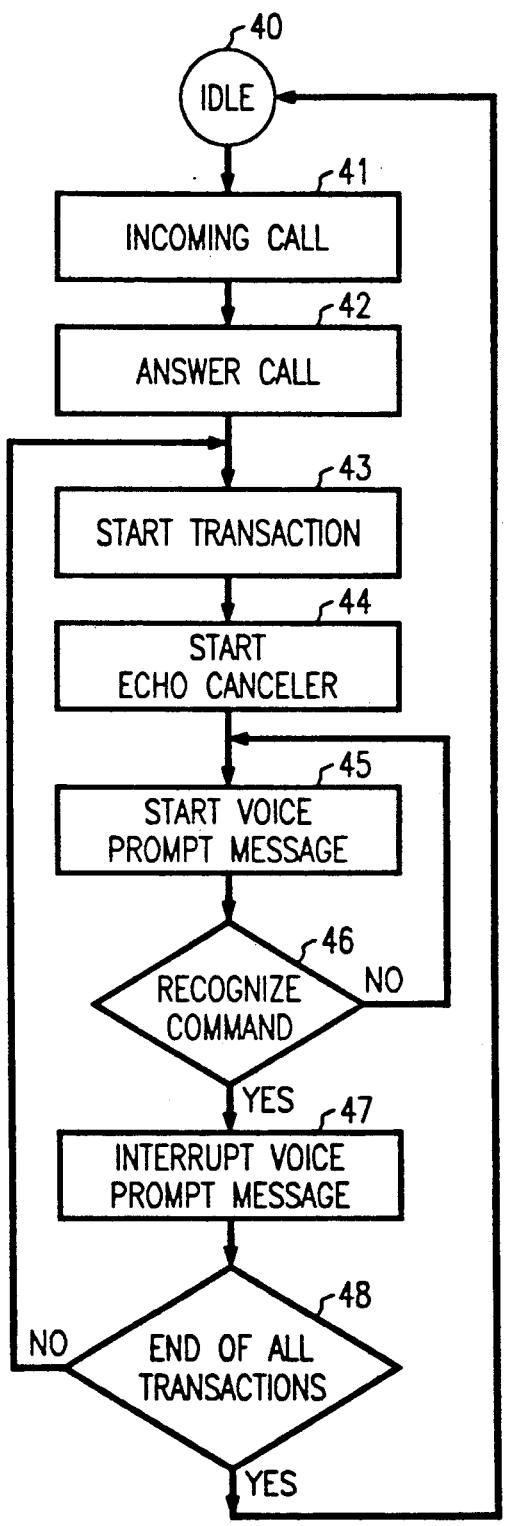

VOICE RESPONSE UNIT

TECHNICAL FIELD

The invention relates to a voice response unit for use with telephone networks to recognize a calling customer voice command.

BACKGROUND AND PROBLEM

Telephone networks are used to connect a customer with a voice response unit associated with a commercial establishment such as a department store. In operation, a calling customer is connected through a telephone network to a voice response unit associated with the department store. The voice response unit responds to a calling customer connection by transmitting a voice prompt message over the telephone network to the calling customer. A typical voice prompt message instructs the calling customer to speak or transmit tones identifying departments available for customer service. For example, the voice prompt message may inform the calling customer to speak or transmit a numerical 1 command to be connected with an order department. The voice prompt message continues to inform the calling customer that a spoken or transmitted numerical 2, 3, 4 or 5 command operates to connect the customer with billing, appliance, apparel or customer information departments, respectively. After receiving the voice prompt message, the calling customer speaks or transmits a numerical number command identifying a department which the calling customer has selected.

Voice response units transmit the entire voice prompt message to the calling customer then waits to receive a customer response. Experienced customers often do not wait until the end of the voice prompt message but speak or transmit a command while receiving the voice prompt message. Many types of customer telephone lines may be connected with a voice response unit. For example, some customer lines may have short 2-wire telephone lines while others may have long repeated 2-wire or 4-wire toll telephone lines. A problem arises in that impedance mismatches arising from the connection of various types of customer telephone lines with a voice response unit reflect a part of the voice prompt message transmitted to the calling customer back to the voice response unit. The reflected part of the voice prompt message is combined with a customer command transmitted during the voice prompt message. The combined customer command and reflected voice prompt message results in a garbled message returned to the voice response unit. Such garbled messages are not recognized by the voice response unit. The calling customer must wait until the end of the transmitted voice prompt message to transmit a responsive command.

SOLUTION

The foregoing problem is solved and voice response units and method of operating voice response units are substantially enhanced by a voice response unit having a voice decoder and a voice recorder for generating voice prompt messages and receiving customer messages and a speech recognizer for recognizing customer commands transmitted by a customer while receiving a voice prompt message. Apparatus interconnects the voice decoder and voice recorder with a telephone line to transmit a generated voice prompt message and receive a customer message in response thereto from a calling customer coupled with the telephone line. The apparatus is also coupled with the speech recognizer for receiving a customer command combined with a portion of the transmitted voice prompt message reflected from the telephone line and cancels the reflected voice prompt message with the transmitted voice prompt message to enable the speech recognizer to respond to the received customer command and interrupt transmission of the voice prompt message to start a new transaction with the customer.

DETAILED DESCRIPTION

Figure 1:
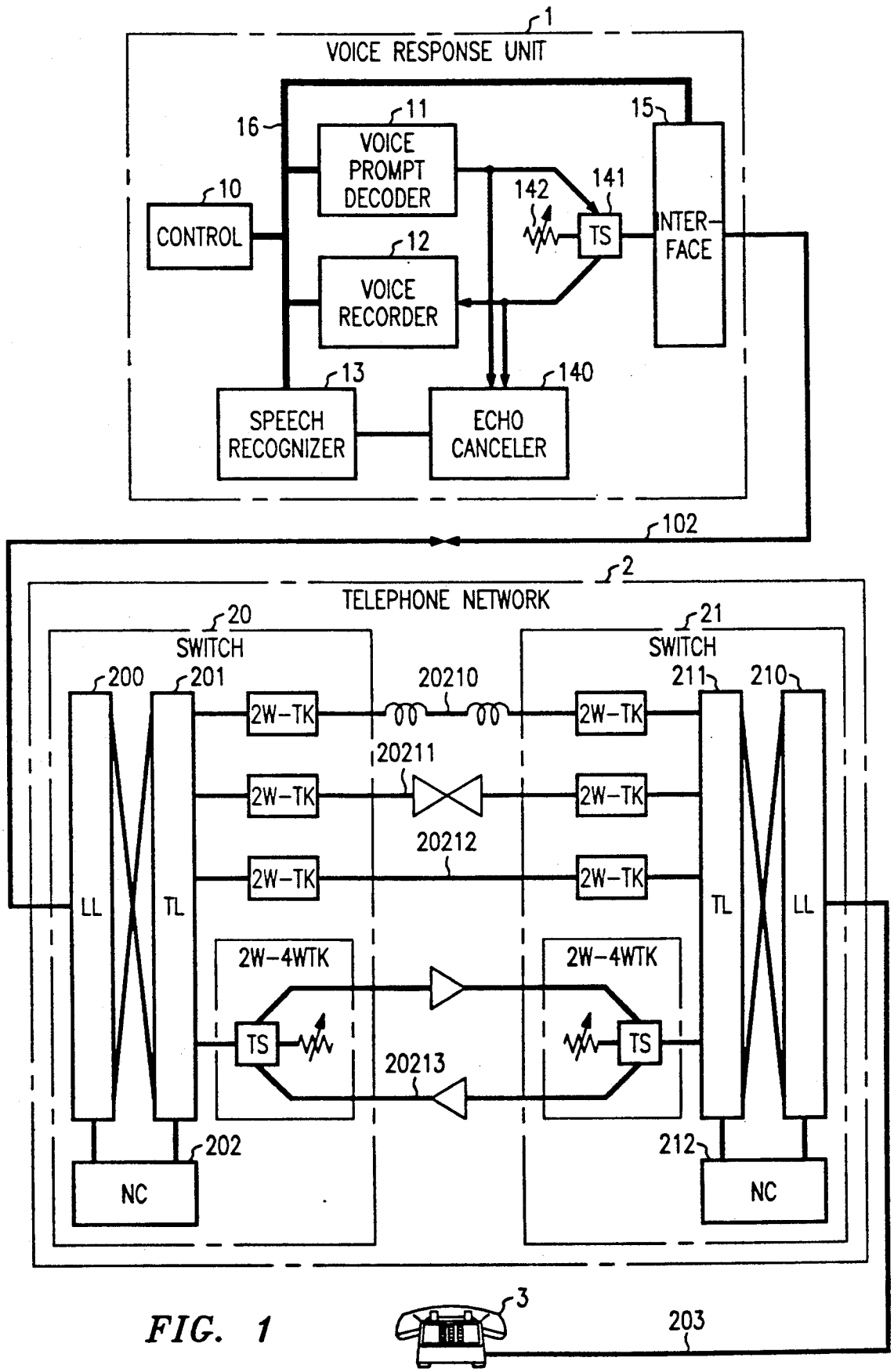
FIG. 1 is a block diagram of a calling customer connected through a telephone network with a voice response unit embodying the principles of the instant invention.

Voice response unit 1, FIG. 1, intended for use at a commercial location, such as a department store, is connected by telephone line 102 with switch 20 of telephone network 2. Customers of the department store each have a telephone set 3 connected by telephone line 203 with a switching system of telephone network 2 such as switches 21 and 20. Switches 20, 21 may be a type of switch, such as the well-known AT&T No. 1, 1A and No. 5 Electronic Switching Systems, and need not be described in detail for an understanding of the invention. Sufficient to say that each switch 20, 21 has equipment, such as network control 202, 212 and line and trunk equipment 200, 210, 201, 211. Line equipment 200, 210 terminate customer telephone lines, such as telephone line 103 and 203. Trunk equipment 201, 211 terminate 2-wire telephone trunks 20210, 20211, 20212 and 4-wire telephone trunks 20213 of telephone network 2. Network control 202, 212 may a program controlled system arranged to control line and trunk equipment 200, 201, 210, 211 to interconnect customer telephone lines and telephone network trunks so that customer telephone lines may be connected with voice response unit 1.

Voice response unit 1 has a voice prompt decoder 11 arranged to receive a digital prompt message from control 10 and decode the received digital message into a voice prompt message. Voice recorder 12 records voice messages received from calling customers located at telephone station 3 and speech recognizer 13 recognizes commands generated by calling customers in response to voice prompt messages generated by voice prompt decoder 11. Echo canceller 140 enables speech recognizer 13 to recognize a calling customer command in the presence of a voice prompt message being transmitted to a calling customer. Interface unit 15 enables voice response unit 1 to answer telephone line 102 and control unit 10 controls the operation of voice response unit 1.

Telephone network 2 in the well-known manner has a large number of switching systems, such as switches 20, 21. Switching systems are interconnected by trunks 20210, 20211, 20212 and 20213 and serve to interconnect calling customer telephone lines 203 with called customer telephone lines 102. Connections are established by selectively interconnecting ones of the trunks and ones of the trunks with customer telephone lines 102, 203 to establish connections between calling and called customers.

A customer, wishing to place an order with a department store having voice response unit 1, removes the hand set of telephone set 3. Switch 21 responds to the removal of the hand set by returning dial tone to telephone set 3. The calling customer dials a telephone number identifying the department store. Switch 21, upon receiving the telephone number, enables telephone network 2 to establish a connection via a trunk 20210, 20211, 20212, and 20213 and switch 20 serving voice response unit 1 of the called department store. Network control 212 of switch 21 establishes a connection between a selected one of trunks 20210, 20211, 20212 and 20213 and telephone line 203 coupled with telephone station 3. Similarly, switch 20 establishes a connection between the selected trunk 20210, 20211, 20212, 20213 and telephone line 102 connected with voice response unit 1.

Voice response unit interface unit 15 responds to a telephone call incoming on telephone line 102 by notifying control 10 of the presence of the incoming call. Control 10 sends a digital voice prompt message to voice prompt decoder 11 and controls voice prompt decoder 11 to generate a verbal voice prompt message. The generated voice prompt message is transmitted over telephone line 102 to switch 20, over the selected trunk 20210, 20211, 20212, 20213 and switch 21 to telephone line 203 and calling telephone station 3.

Figure 2:
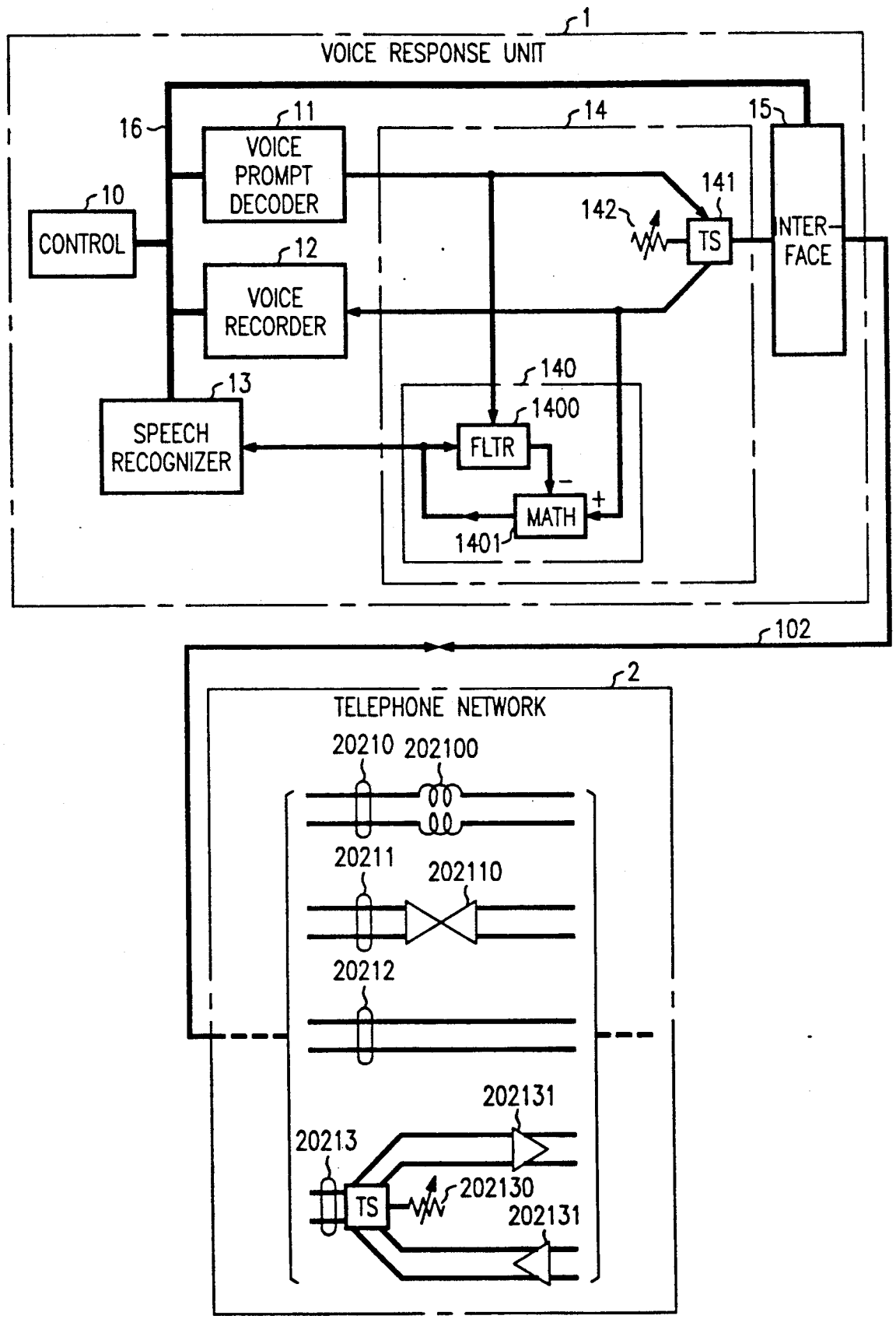
FIG. 2 illustrates details of the voice response unit set forth in FIG. 1, and FIG. 3 sets forth a method of operating the voice response unit set forth in FIGS. 1 and 2 in accordance with the principles of the invention.

Telephone network 2, FIG. 2, has a wide variety of trunks that may be used to interconnect calling telephone station 3 with voice response unit 1. The type of trunk used to complete the telephone connection may depend upon the length of the telephone connection and the type of facilities used to provide the trunk. For example, a calling customer may be located nearby the called department store such that telephone network 2 would interconnect switches 20, 21 with 2-wire trunk 20212, FIG. 2, consisting of a pair of conductors. The calling customer may be located at a distance from the called department store that requires that switches 20, 21 be interconnected by a 2-wire trunk 20210 having loading coils 202100 that function to improve the gain characteristics of the trunk. In yet another application, switches 20, 21 may be interconnected by a 2-wire trunk 20211 having a 2-way repeater 202110 with gain characteristics that enables the calling customer to be coupled with voice response unit 1. Switches 20, 21, FIG. 1, may also be interconnected by 2-wire-4-wire trunk 20213 which has 4-wire term sets 202130, FIG. 2, at each end of trunk 20213 to interconnect a 2-wire telephone line 102, 103 with the 4-trunk facilities. Trunk 4-wire facilities may be represented as having directional gain devices 202131 in each 2-wire leg to improve the overall gain characteristics of 4-wire trunk 20213.

Voice response unit apparatus 14 has universal and bidirectional transmission ports for use in interconnecting apparatus with telephone line 102. For example, a receiving unidirectional transmission port is coupled with voice prompt decoder 11 to receive a voice prompt message generated by voice prompt unit 11 for transmission to a calling customer. A first transmitting unidirectional transmitting port is coupled with voice recorder 12 so that voice reorder 12 may receive verbal telephone messages generated by calling customers. A second transmitting unidirectional transmitting port is coupled with speech recognizer 13 in order that speech recognizer 13 may receive verbal commands from the calling customer in response to the transmitted voice prompt message. Unidirectional transmission ports are interconnected with 4-wire term set 141 which in turn is coupled with a bidirectional transmission port coupled with telephone line 102. Thus, voice prompt decoder 11 and voice recorder 12 are connected via the unidirectional and bidirectional transmission ports and 4-wire term set 141 with interface unit 15 and telephone line 102.

The 4-wire term set 141 has impedance matching apparatus 142 which functions to match the combined impedances of telephone line 102 and telephone network trunks 20210, 20211, 20212, 20213 that are selectively interconnected with telephone line 102. When impedance matching apparatus 142 matches the combined impedances of telephone line 102 and a trunk coupled therewith, all of a voice prompt message generated by voice prompt decoder is transmitted over telephone line 102 to calling telephone set 3. If a mismatch of impedances occurs, such as a condition whereby impedance apparatus 142 does not match the combined impedance of telephone line 102 and an interconnected telephone network trunk, a portion of the transmitted voice prompt message is reflected back from telephone line 102 to voice recorder 12 and echo canceller 140.

Echo canceller 140 is interconnected with the unidirectional ports coupled with voice prompt decoder 11 and with voice recorder 12. In addition, echo canceller 140 is coupled via a unidirectional transmission port of apparatus 14 with speech recognizer 13. A voice prompt message transmitted by voice prompt decoder 11 is applied to a filter 1400. The output of filter 1400 is coupled with one input of math unit 1401 which has another input coupled with the unidirectional transmission port connected with voice recorder 12. Math unit 1401 operates to subtract a voice prompt message generated by voice prompt decoder 11 from a message received on telephone line 102 which may be combined with a portion of the transmitted voice prompt message that is reflected by a mismatch of impedance apparatus 142 with the combined impedances of telephone line 102 and a telephone network trunk. The message received from calling telephone set 3, FIG. 1, from which the reflected portion of the transmitted voice prompt message has been cancelled by echo canceller 140, FIG. 2, is transmitted via a unidirectional port of apparatus 14 to speech recognizer 13.

In operation, FIG. 1, a calling customer wanting to place an order with a department store removes the hand set of telephone set 3 and dials the telephone number of the department store. Network control 212 of telephone network switch 21 responds to the dialed number by enabling line and trunk links 210, 211 to establishing a voice connection from telephone line 203, via a selected one of the telephone trunks 20210, 20211, 20212 or 20213, with switch 20. Network control 202 of switch 20 controls trunk and line links 201, 200 to establish a connection from a selected trunk 20210, 20211, 20212, 20213 with telephone line 102 connected with voice response unit 1.

Voice response unit 1, FIG. 3, initially in an idle state, step 40, receives the incoming call from telephone set 3, step 41. The incoming call, step 41, is answered, step 42, by interface unit 15, FIG. 2. Interface unit 15 notifies voice response unit control 10 of the presence of the incoming call via bus 16. Control 10 starts a customer transaction, FIG. 3, step 43, by sending a digital voice prompt message over bus 16, FIG. 2, to voice prompt decoder 11. Voice prompt decoder 11 transmits the generated voice prompt message via a unidirectional transmission port to 4-wire term set 141. The 4-wire term set 141 transmits the voice prompt over telephone line 102 through switches 20, 21 and the selected trunk 20210, 20211, 20212 or 20213 and telephone line 203 to telephone set 3.

The voice prompt message instructs the calling customer to speak a command or transmit command tones identifying departments available for customer service. For example, the voice prompt message may inform the calling customer to speak or transmit a command comprising a numerical 1 if the calling customer desired to be connected with an order department. The voice prompt message continues to inform the calling customer that a spoken or transmitted numerical command of 2, 3, 4 and 5 will operate to connect the customer with billing, appliance, apparel or customer information departments, respectively.

When a call connection has been established with voice response unit 1, FIG. 2, a mismatch of impedance apparatus 142, with the combined impedances of telephone line 102 interconnected with a trunk of telephone network 2, results in a portion of the transmitted voice prompt message being reflected and returned to voice recorder 12 and echo canceller 140. Each voice prompt message transmitted to a calling telephone set 3 by voice prompt decoder 11 is applied to echo canceller filter 1400 connected with the unidirectional transmission port coupled with voice prompt decoder 11 for the purpose of filtering the voice prompt message transmitted to calling telephone set 3. Math unit 1401, having inputs connected with filter apparatus 1400 and 4-wire term set 141 and an output connected with speech recognizer 13, subtracts the filtered voice prompt message from the voice prompt message reflected from 4-wire term set 141 to cancel the reflected voice prompt message.

The calling customer may, while receiving a first portion of the voice prompt message at telephone set 3, FIG. 1, verbally speak a numerical 1 command into the hand set of telephone set 3 indicating that the customer would like to place an order with the order department of the department store. The customer spoken numerical 1 command is received over the telephone network selected trunk and telephone line 102 at voice response unit 1. Since the voice prompt message is still being transmitted by voice prompt decoder 11, the received customer numerical 1 command is combined with the portion of the transmitted voice prompt message reflected from telephone line 102. The resulting combined message is transmitted by 4-wire term set 141, FIG. 2, to an input of echo canceller math unit 1401. Math unit 1401, receiving the transmitted voice prompt message, functions to cancel the reflected voice prompt message from the combined voice prompt message and customer numerical 1 command by subtracting the transmitted voice prompt message from the combined message appearing at the input of math unit 1401 from 4-wire term set 141. The resulting customer numerical 1 command is applied, via a unidirectional transmission port of apparatus 14, to speech recognizer 13. Speech recognizer 13 responds to receipt of the received numerical 1 command by sending the received calling customer command to control 10. Control 10 responds to the received command and overrides the transmitted voice prompt message by controlling voice prompt decoder 11 to interrupt transmission of the voice prompt message and end the current transaction with the calling customer. Following interruption of the transaction, voice response unit 1, under control of control 10, initiates procedures to record order information of the calling customer.

In the method of operation, FIG. 3, the voice response unit is in an initial idle state, step 40. Upon receiving an incoming calling customer call, step 41, voice response unit 1 answers the customer call, step 42, and starts a first transaction, step 43, by transmitting a voice prompt message to the calling customer and prepares to receive customer messages. Echo canceller 140, FIG. 1, starts to cancel the portion of the transmitted voice prompt message generated by voice prompt decoder 11 from the portion of the voice prompt message reflected from 4-wire term set 141, FIG. 3, steps 44, 45. A customer command, received and recognized by the voice prompt decoder 11, step 46, enables voice response unit 1 to override the transmitted voice prompt message by controlling voice prompt decoder 11 via control 10, FIG. 2, to interrupt transmission of the voice prompt message by stopping transmission thereof, FIG. 3, step 47. If other transactions are required, step 48, steps 43 through 48 are repeated until all transactions are completed at which time voice response unit 1 returns to the idle state, step 40. If speech recognizer 13 does not recognize the customer command, step 46, the voice prompt message continues to be sent to the calling customer.

We claim:

1. A voice response unit having a voice decoder and a voice recorder for generating voice prompt messages and receiving customer messages and a speech recognizer for recognizing customer commands comprising
   means for interconnecting the voice decoder and voice recorder with a telephone line to transmit a generated voice prompt message to and receive a customer message in response thereto from a calling customer coupled with the telephone line and wherein said means are coupled with the speech recognizer for receiving a customer command combined with a reflection of the transmitted voice prompt message reflected from the telephone line and cancelling said transmitted voice prompt message reflection with respect to said received customer command thereby enabling the speech recognizer to respond to the customer command.

2. A voice response unit having a voice decoder for generating voice prompt messages and a speech recognizer for recognizing customer commands comprising
   means for interconnecting the voice decoder and a voice recorder with a telephone line, and
   means coupled with said interconnecting means and the speech recognizer for receiving a customer command on the telephone line and which received customer command is combined with a voice prompt message generated by the voice decoder and reflected from the telephone line and for cancelling said reflected voice prompt message from said received customer command thereby enabling the speech recognizer to respond to the received customer command.

3. The voice response unit set forth in claim 2 wherein said interconnecting means comprises
   means having a pair of unidirectional transmission ports each coupled with one of the voice decoder and voice recorder and having a bidirectional transmission port coupled with the telephone line for interconnecting the voice decoder and voice recorder with the telephone line for transmission of a voice prompt message generated by the voice decoder to a calling telephone set and for receiving a customer message at the voice recorder in response thereto.

4. The voice response unit set forth in claim 3 wherein said receiving and cancelling means comprises
means interconnecting with said unidirectional transmission ports and with the speech recognizer for receiving a transmission of a generated voice prompt message and said received customer command combined with the voice prompt message transmission reflected from the telephone line and for cancelling said reflected voice prompt message transmission from said combined customer command and reflected voice prompt message transmission thereby enabling the speech recognizer to receive the customer command.

5. The voice response unit set forth in claim 3 wherein said receiving and cancelling means comprises
means connected with a first one of said unidirectional transmission ports coupled with the voice decoder for filtering a transmission of a generated voice prompt message transmitted to a calling telephone set coupled with the telephone line, and
means connected with said filtering means and said speech recognizer for subtracting said filtered voice prompt message transmission from said customer command combined with a voice prompt message transmission reflected from said telephone line to cancel said reflected voice prompt message transmission from said combined customer command and reflected voice prompt message transmission and transmitting said received customer command to the speech recognizer.

6. The voice response unit set forth in claim 4 or 5 wherein said voice response unit comprises
means connected with the voice decoder and the speech recognizer and responsive to receipt of said customer command for overriding said voice prompt message transmission by controlling the voice decoder to interrupt said voice prompt message transmission with a calling customer.

7. A voice response unit having a voice decoder for generating voice prompt messages, a voice recorder for receiving customer messages and a speech recognizer for recognizing customer commands comprising
means having a pair of unidirectional transmission ports each coupled with one of the voice decoder and voice recorder and interconnected with a bidirectional transmission port coupled with a telephone line for interconnecting the voice decoder and voice recorder with the telephone line,
means coupled with the telephone line and responsive to a call incoming from a calling telephone set coupled with the telephone line for enabling the voice decoder to transmit a voice prompt message to the calling telephone set and to receive a customer message at the voice recorder in response thereto,
means connected with one of said unidirectional ports coupled with the voice decoder for receiving and filtering a transmission of a voice prompt message transmitted to the calling telephone set,
means connected with said receiving and filtering means and with said speech recognizer for subtracting said filtered voice prompt message transmission from a received customer command combined with a voice prompt message transmission reflected by the telephone line to cancel said reflected voice prompt message transmission from the combination thereof with the customer command and for transmitting said received customer command to the speech recognizer, and
means connected with said voice decoder and said speech recognizer and responsive to receipt of said received customer command for overriding said voice prompt message transmission by controlling the voice decoder to interrupt transmission of said voice prompt message transmission and end a transaction with the calling telephone set.

8. Apparatus for interconnecting a voice response unit having a voice decoder and a voice recorder for generating voice prompt messages and receiving customer messages and coupled with a control coupled with a speech recognizer for recognizing customer commands with a telephone line comprising
means having first and second unidirectional transmission ports each coupled with one of the voice decoder and voice recorder and interconnected with a bidirectional transmission port coupled with the telephone line for interconnecting said voice decoder and voice recorder with the telephone line to transmit a voice prompt message from the voice decoder to a calling telephone set and to receive a message at the voice recorder from the calling telephone set in response thereto, and
means interconnected with said first and second unidirectional transmission ports and having a third unidirectional transmission port coupled with the speech recognizer for receiving a voice prompt message transmission transmitted to the calling telephone set and a calling customer command combined with a voice prompt message transmission reflected from the telephone line and for cancelling said reflected voice prompt message from the combined calling customer command and reflected voice prompt message transmission thereby enabling the speech recognizer to receive the calling customer command and enable the control to direct the voice decoder to interrupt the voice prompt message transmission.

9. A method of operating a voice response unit interconnected with a telephone line wherein the voice response unit has a voice decoder and a voice recorder for generating voice prompt messages and receiving customer messages and in combination with a speech recognizer for recognizing customer commands comprising the steps of
answering an incoming telephone call from a calling customer coupled with the telephone line and starting a transaction by transmitting a voice prompt message generated by the voice decoder over the telephone line to the calling customer and receiving a message at the voice recorder in response thereto, and
cancelling a transmitted portion of the generated voice prompt message from a received customer command combined with a reflection of the transmitted portion of the transmitted voice prompt message reflected from the telephone line to enable the speech recognizer to receive the calling customer command and enable a control to override said transmitted voice prompt message by controlling the voice decoder to interrupt transmission of said voice prompt message and end said transaction with the calling customer.

* * * * *